United States Patent [19]

Anderson

[11] 3,908,056

[45] Sept. 23, 1975

[54] OPTICALLY DECORATIVE WEB

[75] Inventor: Raymond H. Anderson, St. Mary's Point, Minn.

[73] Assignee: Minnesota Mining and Manufacturing Company, St. Paul, Minn.

[22] Filed: Sept. 10, 1973

[21] Appl. No.: 395,586

[52] U.S. Cl. ............. 428/142; 240/41.3; 350/292; 353/38; 428/409
[51] Int. Cl.² ............................................. B44F 1/00
[58] Field of Search ............ 161/3, 1, 3.5, 4, 5, 6; 52/716, 717; 353/38; 240/41.3; 340/383; 350/292

[56] References Cited
UNITED STATES PATENTS

| | | | |
|---|---|---|---|
| 1,788,937 | 1/1931 | Wood | 240/41.4 |
| 2,326,042 | 8/1943 | Lessman | 353/38 |
| 2,726,573 | 12/1955 | Maloff | 350/127 |
| 2,824,396 | 2/1958 | Thomas | 40/132 |
| 3,064,125 | 11/1965 | Gott | 240/41.3 |
| 3,293,982 | 12/1966 | Appeldorn | 353/38 |
| 3,383,676 | 5/1968 | Nagel | 340/383 |

*Primary Examiner*—Mayer Weinblatt
*Assistant Examiner*—Edith Buffalow
*Attorney, Agent, or Firm*—Alexander, Sell, Steldt & Delahunt

[57] ABSTRACT

A thin polymeric strip material which is formed on one surface with a plurality of ridges and grooves defining a surface affording in the presence of light an optical image in space having an appearance other than that of a surface of said strip. The article may have a coating over the surfaces of the ridges affording a reflective surface and an optical image. Preferably an adhesive is applied on the strip material to bond the same to the surface of an article to afford ornamental and utilitarian properties to the same by providing a predetermined optical effect.

30 Claims, 11 Drawing Figures

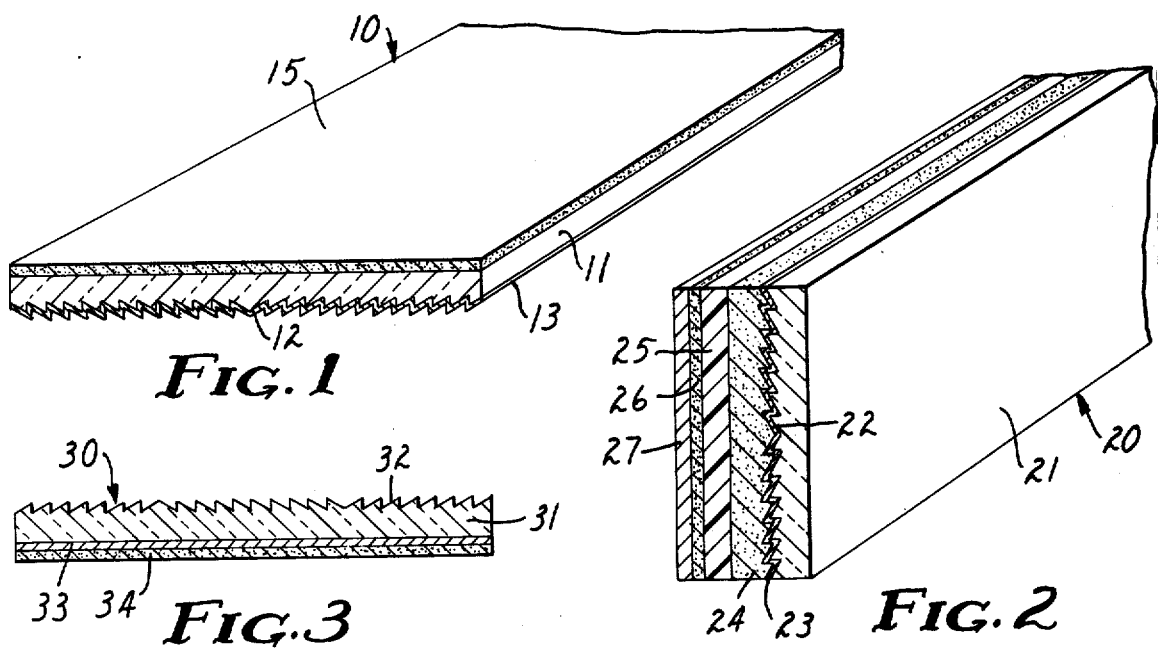
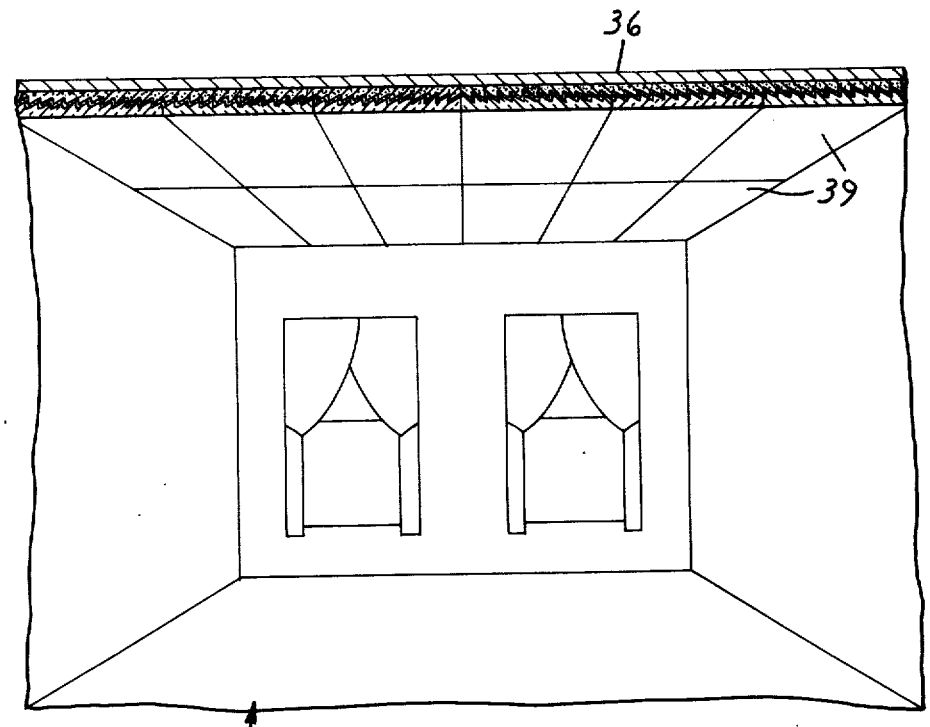

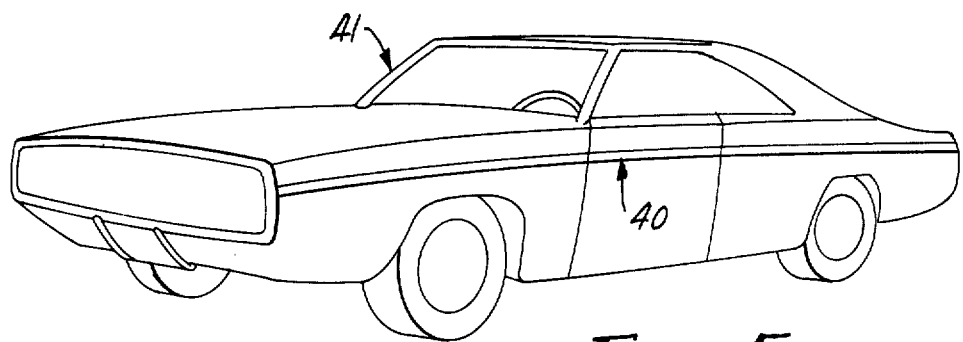
FIG. 5
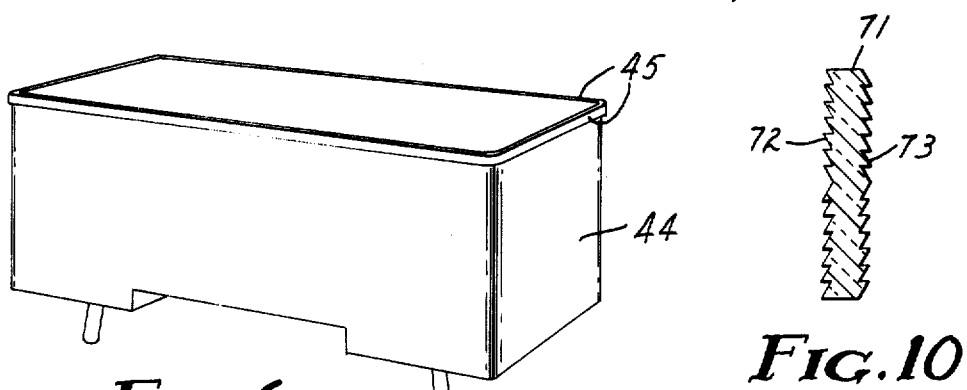
FIG. 6
FIG. 10
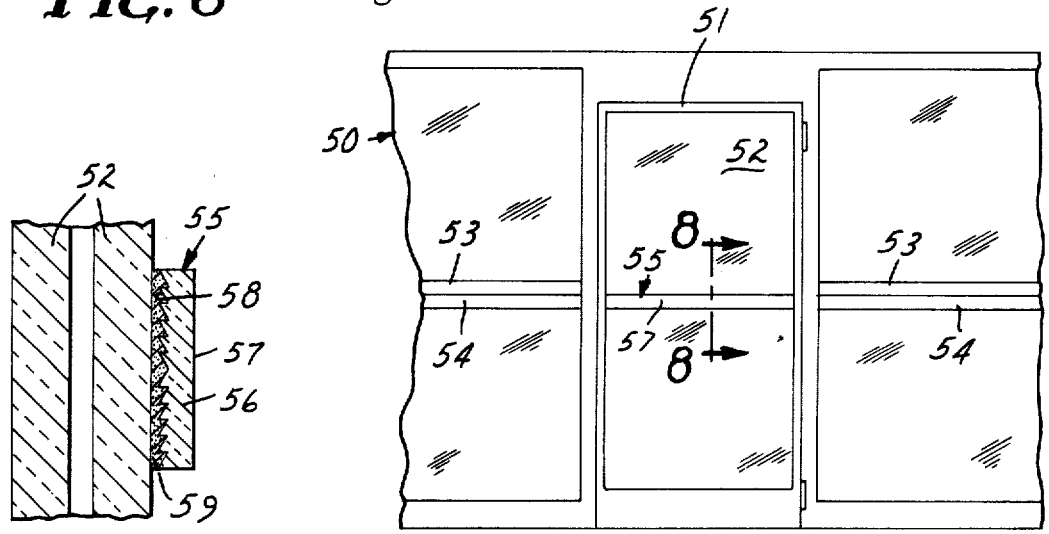
FIG. 8
FIG. 7
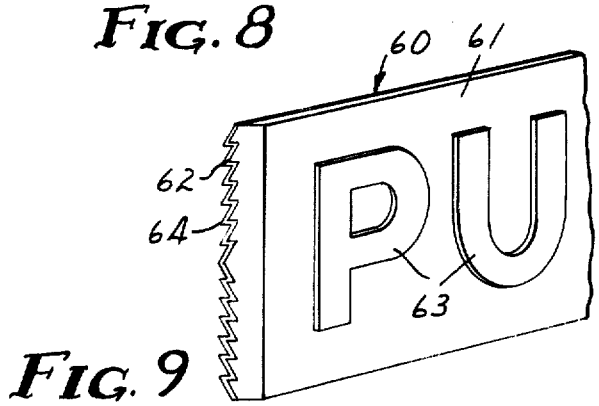
FIG. 9
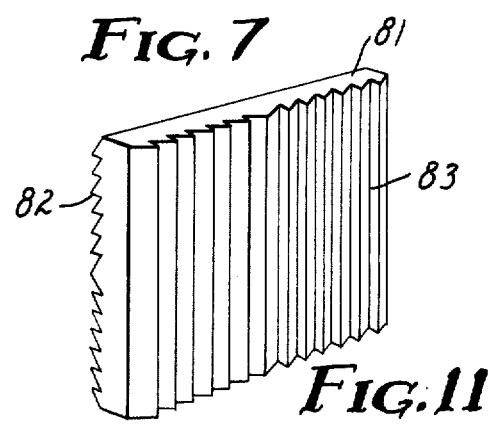
FIG. 11

OPTICALLY DECORATIVE WEB

BACKGROUND OF THE INVENTION

1. Field of the Invention

The present invention relates to improvements in decorative material and in one aspect to a polymeric material for use in place of existing metallic strips or expensive glass mirrors used as ornamentation on surfaces of various articles. The material formed in accordance with the present invention utilizes precisely formed lenticular systems to produce in the presence of light a real or virtual image of the surroundings that is similar to that formed by nonplanar refracting and reflecting surfaces, giving the observer the impression the material has a surface other than coincident with a surface of said strip, such as that of a convex or concave metallic strip or a transparent semicylindrical strip.

2. Description of the Prior Art

The prior art disclosed many types of articles utilizing a Fresnel-type or lenticular optic system wherein a series of ridges and grooves reproduce a spherical surface to obtain a substantially similar optical property. These devices are used with a source of light in luminars, headlights and the like to refract light from said source in order to distribute it according to some desired pattern. They are also utilized for projecting screens and in back lighted signs. In these devices using the Fresnel-type lens with a source of light to produce an optical refraction for dispersion or collimation of the light is known in the art.

SUMMARY OF THE INVENTION

The present invention differs from the prior art in that it provides for a strip or web product so designed that ambient light produces a real or virtual image of the surroundings such that the eye sees an image like that of a nonplanar reflecting and/or refracting strip, which image is different from any surface present on the web product. The present invention provides, upon the precise production of the lenticular surface, surfaces producing images of varying shapes to produce many desired decorative effects and the strips will functionally provide protective bands, barriers, edgings and signs.

The present invention is directed to a combination affording an optical decorative web which fills the functional requirement of other more expensive items which other items are also more difficult to use and subject to damage. The present invention provides a strip for decorating an article to produce on the article the effect of another different product by the formation of an optical image in the presence of ambient light. The strip of the web is formed of a polymeric material and on one surface is formed a plurality of ridges and grooves. The surfaces forming the ridges are precisely formed such that they each cooperate with the adjacent surfaces to form a real or virtual image which image is other than that of an actual surface of the strip. This image would be of a surface other than a planar surface and the strip of material is suitably bonded to the article upon which it is placed. The surface of the strip having the ridges which form the image may be coated with a metallic reflective material making the surface reflective to produce the image or the surface opposite the lenticular surface may be coated with a reflective material if the polymeric material is transparent. Thus the polymeric material may be transparent or opaque, depending on the use. Preferably a pressure-sensitive adhesive is applied to one surface of the strip, providing for the bonding of the material to the article. The strip may be so designed that it will cooperate with adjacent strips to afford a predetermined image with parts of the image resulting from the several strips. The strips may also be designed to provide a protective surface, barrier, edging, molding, legend or sign. Articles having these strips may include surface areas in rooms such as ceilings, vehicles, furniture, glass panels, signs or other articles utilizing decorative trim or requiring a protective strip. The glass panels may be windows or doors enclosing a space.

BRIEF DESCRIPTION OF THE DRAWING

The present invention will be more fully described hereinafter with reference to the accompanying drawing wherein:

FIG. 1 is a fragmentary perspective view of a section of a web according to the present invention;

FIG. 2 is a fragmentary perspective view of a section of a web illustrating a second embodiment;

FIG. 3 is a cross-sectional view of a third embodiment of the web;

FIG. 4 is a fragmentary perspective view of a room;

FIG. 5 is a fragmentary perspective view of a vehicle;

FIG. 6 is a perspective view of an item of furniture;

FIG. 7 is an elevational view of a glass enclosure with a glass door;

FIG. 8 is a sectional view taken along the line 8—8 of FIG. 7;

FIG. 9 is a fragmentary perspective view of a section of a web having indicia applied thereto;

FIG. 10 is a sectional view of a strip constructed according to the present invention for use in a web; and FIG. 11 is a perspective view of a strip for use in a web of a further embodiment.

DESCRIPTION OF THE PREFERRED EMBODIMENT

The decorative web of the present invention, when applied to a surface of an article to be decorated, projects an optical image to the viewer which is different from the real surface of the article. Referring now to FIG. 1 there is illustrated a laminated web 10 comprising a thin strip 11 of opaque polymeric material, which strip 11 has formed on one surface 12 thereof a series of ridges and grooves which define a lenticular system for the refraction or reflection of ambient light to produce an image of a surface different from that surface. The surface 12 as illustrated has parallel ridges formed by facets defining a convex surface joined by surfaces forming steps connecting the adjacent facets. The surfaces may define a surface substantially similar to a concave and/or convex surface. This surface 12 is coated as by vapor coating with a metallic layer 13 which is reflective. This reflective layer 13 provides for specular reflection from its exposed surface which corresponds with the surface of the strip 11. Applied to the smooth surface of strip 11 opposite the surface 12 is an adhesive layer 15 which serves to bond the strip 11 to a surface to decorated, protected or visibly indicated such as the glass panels.

In FIG. 2 there is illustrated a second embodiment of the web, which is generally indicated by the reference numeral 20. This web 20 comprises a strip 21 of light-transparent polymeric material and is formed with a smooth surface on one side and an opposite second surface 22 formed with a series of ridges and grooves which surfaces combine to form an optic image in the presence of light different from that of said surfaces. The ridges and grooves on the surface 22 may be parallel and define a surface having a concave or convex appearance when viewed from the smooth face in the presence of ambient light or combinations of these shaped surfaces or combinations of these surfaces with different radii. As illustrated, the lenticular surface 22 is provided with a coating 23 of metallic material which at the interface with the surface 22 will provide a specular reflector. Applied to the metallic coating 23 is a layer 24 of pressuresensitive adhesive, which layer may be a coating or a coating on a backing sheet 25. The backing 25 may be formed of a flexible resilient polymeric foam which may also have adhered to its opposite surface a coating of pressure-sensitive adhesive which would bond the web 20 to an article whether or not the article may have an irregular surface. A release liner 27 is placed over an adhesive coating 26 until the web is to be applied. Alternatively, the foam backing 25 and adhesive layer 26 may be left off and the removable liner 27 may be applied directly to the adhesive layer 24. The liner 27 would be suitably coated with a release material such that it can be easily removed from the adhesive coating, permitting the adhesive coat 26 or 24 to be placed against the surface of an article.

In FIG. 3 there is illustrated a further web 30 which comprises a strip of transparent polymeric material 31 having on its exposed surface 32 a plurality of ridges and grooves. The ridges and grooves illustrated are exaggerated in size but illustrate a Fresnel-type surface depicting both concave and convex portions. The opposed smooth surface of the strip 31 is vapor-coated with a coating 33 of metallic material to make it specularly reflective such that light entering the surface 32 will be refracted by that surface, the light would be reflected from the coating 33 and directed back through the surface 32. This provides a viewer, in the presence of ambient light, the illusion of a surface which is actually different from that of the strip 31. A bonding or adhesive coating 34 may be applied to the coating 33 to permit attachment of the web 30 to an article.

The number of ridges on the strips 11, 21 and 31 may number between 25 and 400 per inch of width and the thickness of the strips 11, 21 and 31 may be from 0.002 to 0.20 inch. The webs may be sheet length or continuous. Examples of the polymeric material for use in the strips include polyvinylchloride, polycarbonate, polymethylmethacrylate, polyvinylbutyrate and polystyrene.

The optical effect provided by the webs 10, 20, or 30, may be combined and with various articles achieve combinations for purposes of decoration and for offering protection to the article or protection to people alerting them to the presence of the article, especially large plate glass windows or doors.

There is shown in FIG. 4 a perspective view of a room 35 wherein the ceiling 36 has a mosaic made of sheets or strips 39 of material corresponding to the webs 10, 20 or 30, with the sheets 39 positioned in juxtaposed relationship and covering the ceiling 36. Where the ridges and grooves of the strips 39 extend parallel and lengthwise of the ceiling 36 on each of the strips, each strip may lend a portion of a total image produced on the ceiling, but, to the observer entering the room and looking toward the ceiling, in the presence of the ambient light, the optical effect would be the image of an arched ceiling which would be concave to the viewer if each of the webs positioned on the ceiling had the grooves prepositioned to define a portion of an image of such a surface. It is possible also in decorating ceilings that a second layer of a transparent strip material such as the strip 21 could be positioned and adhered to or supported below the surface of the sheets 39 positioned on the ceiling 36 such that the ridges and grooves of the second layer would be normal to the position of the ridges and grooves on the first layer, and an observer entering the room with such a composite, would have the sensation of being in a room having a dome ceiling, yet in fact, the true surface of the ceiling would be at all times at the same height.

Referring now to FIG. 5 there is illustrated a vehicle 41, e.g., an automobile, having a web 40 extending along the side of the automobile. The web 40 bonded to the side of the automobile may correspond to the web 10, 20, or 30. Preferably, the web 40 is structured generally like the web 20 which provides a smooth outer surface 21 but a structure which will provide not only the appearance of a metallic strip on the side of the car but one which is flexible, dent-proof, resistent to scratches and permanent bending, and one which will absorb the shock of other doors being opened against the side of the vehicle 41. The strip would then offer not only the decorative effect provided by the normal chrome strips used as decorative pieces of a vehicle but would also provide a protective band along the edge of the vehicle to protect the paint on the surface of the vehicle, above and below the web, from being chipped.

FIG. 6 shows a piece of furniture 44 having a molding 45 extending around the periphery of the top of the piece of furniture. The piece of furniture 44 illustrated is a desk and the molding 45 offers a decorative appearance and will also protect the corners of the desk against chipping if the same are accidently struck in some manner. The molding 45 may be a strip corresponding to the web 10, 20, or 30, and is bonded to the surface of the furniture 44 to be decorated.

FIG. 7 discloses a doorway in a building which building utilizes extensive panels of glass 50 as the walls, either as interior or exterior walls. A metal door 51 having a large glass panel 52 is hinged in the wall. The large glass panels 50 and door 51 offer a danger to persons as they may not see the same because of reflections or lack of reflections of light and may accidently walk into the same giving them a bump, or, if sufficient force is exerted, there is the possibility of breaking a panel. In each instance, on the glass panels 50 forming the walls and on the glass 52 in the door 51, a web is bonded to the surface of the glass to extend across the same in a position which will be easily observed by people using the building. The webs will serve not only as decorative members applying to the panel the appearance of a glass rod or metallic bar extending across the panel but will also make the glass very visible to the pedestrians due to the formation of an apparent barrier in their path. The glass panels 50 may have one or more webs 53 and 54, and the door glass 52 may have a web 55 which webs 53, 54 and 55 may have a structure as described above for webs 10, 20 or 30. Alternatively, as shown in FIG. 8 the glass 52 for the door 51 may be a thermopane or two layers of glass spaced from each other, and the web 55 may comprise a strip 56 of transparent polymeric material having a smooth outer surface 57 and having a surface 58 provided with a plurality of parallel ridges and grooves, said ridges having surfaces which cooperate with surface on adjacent ridges to form a cylinder lens of the Fresnel-type. Onto the surface 58 is applied a coating 59 of a transparent pressure sensitive adhesive, e.g., a polyacrylate adhesive as disclosed in the aforementioned Ulrich U.S. Pat. No. Re.24,906. When this web 55 is bonded to the glass of a panel or door it gives the appearance of a semicylindrical glass rod extending across the surface. The webs 53 and 54 may correspond to the web 55 or they may correspond to webs such as 10, 20 and 30.

The web 55 may also be provided with indicia to make a directional sign or legend. Signs or legends to give instruction, i.e., push or pull, and for giving directions for example along hallways to indicate the location of various offices or rooms, exits, etc., may have a decorative effect when a web as illustrated in FIG. 9 and generally designated 60, is formed. The web 60 comprises a transparent strip 61 of polymeric material having on the surface 62 a plurality of parallel ridges and grooves defining a concave or convex optical surface. On the smooth surface of the strip 61 is painted, in either opaque or transparent material, suitable indicia 63 to provide the proper legends such as "push," "pull," "exit," etc. The web 60 provides a novel optical effect in that the legends formed by the indicia 63 appears to be other than coincident with a surface of the strip. The image tends to float the legend off the face of the viewed background. A bonding material may be applied to the metal coating 64 applied to the surface 62. Alternatively the indicia may be applied to the surface 62 and a similar effect will occur.

Referring now to FIG. 10, there is illustrated a transparent strip 7 having a surface 72 formed with ridges and grooves extending parallel along the length of the strip and the opposite surface 73 is also formed with parallel ridges and grooves. The ridges on one surface are selected to be additive to the optical effect produced by the ridges on the other surface producing an image which may have a stronger curve, shorter radius, than produced from a single lenticular surface. FIG. 11 illustrates a further embodiment. In this figure a transparent strip 81 has parallel ridges and grooves on one surface 82 but the parallel ridges and grooves on the opposite side 83 are angularly related to the ridges and grooves on surface 82. The surface 82 and 83 combine to produce images of hemispherical surfaces in side-by-side relationship along the strip or with a large sheet, an image of a single hemispherical surface providing the optical power of the two surfaces is similar. The ridges and grooves of strips 71 and 81 can have a size and be formed of materials similar to strips 11, 21 and 31.

Having thus disclosed the present invention with reference to several embodiments thereof, it should be understood that other embodiments may come within the scope of the invention as defined in the appended claims.

What is claimed is:

1. A web comprising
   an elongate thin strip of polymeric material having opposite surfaces, one of said surfaces being smooth and the opposite surface being formed with a plurality of ridges and grooves, the surfaces forming the ridges producing in the presence of light an image such that the strip has an appearance other than that of a surface of said strip and said image would be other than coincident with said surfaces, and
   a layer of adhesive applied to a surface of said strip.

2. A web according to claim 1 wherein the ridges and grooves on the strip are coated with a specular reflective metallic material.

3. A web according to claim 2 wherein said layer of adhesive is applied to said metallic material.

4. A web according to claim 1 wherein a group of contiguous ridges define one image and an adjacent group of contiguous ridges define another image.

5. A web according to claim 1 wherein the strip has a thickness of between 0.002 inch to 0.20 inch.

6. A web according to claim 1 wherein said layer of adhesive is coated onto the smooth surface of the strip.

7. A web according to claim 1 wherein said polymeric material is opaque and the adhesive layer is coated on the smooth surface, and a specular reflective material is applied to said surface formed with ridges and grooves.

8. A web according to claim 1 wherein said strip is transparent to light.

9. A web according to claim 8 wherein a specular reflective material is coated on said smooth surface.

10. A web according to claim 8 wherein a specular reflective material is coated on said surface formed with ridges and grooves and said adhesive layer is applied to said reflective material.

11. In combination, an article having a surface to be decorated or protected,
    a strip of polymeric material having opposite surfaces and formed on one of said surfaces with a plurality of ridges and grooves, the surfaces forming the same producing in the presence of light an image of the surroundings such that the surface of the strip has an appearance other than coincident with a surface of said strip and said image would be other than planar, and
    means for bonding the thin strip to the surface of said article.

12. A combination according to claim 1 wherein the parallel ridges and grooves on the strip are coated with a reflective metallic material to make said surfaces of said ridges reflective.

13. A combination according to claim 12 wherein an adhesive is applied to the metallic material.

14. A combination according to claim 11 wherein a plurality of said strips are positioned in contiguous relation on said surface of the article to define an irregular surface.

15. A combination according to claim 11 wherein the strip has a thickness of between 0.002 inch to 0.20 inch.

16. A combination according to claim 1 wherein said strip has a smooth surface and the means for bonding the strip is an adhesive coated onto said smooth surface of the strip.

17. A combination according to claim 12 wherein the means for bonding the thin strip to the surface comprises a pressure-sensitive adhesive tape comprising a flexible resilient polymeric foam backing coated on both surfaces and having one surface thereof bonded to the surface of said strip provided with said ridges and grooves and having another surface bonded to said article.

18. A combination according to claim 11 wherein said strip is transparent to light and has a smooth surface opposite said surface with ridges and grooves.

19. A combination according to claim 18 wherein a reflective material is applied to said smooth surface.

20. A combination according to claim 18 wherein a reflective material is applied on said surface formed with ridges and grooves and said means for bonding comprises an adhesive applied to said reflective material.

21. A combination according to claim 11 wherein said article is a ceiling.

22. A combination according to claim 21 wherein said strip is placed adjacent other strips on said surface of said ceiling and combine therewith to form a predetermined image.

23. A combination according to claim 11 wherein said article is a piece of furniture.

24. A combination according to claim 12 wherein said article is a vehicle.

25. A combination according to claim 11 wherein said article is a glass panel.

26. A combination according to claim 18 wherein said article is a glass panel.

27. A combination according to claim 18 wherein indicia is applied onto a surface of said strip.

28. A combination according to claim 18 wherein indicia is applied onto said smooth surface.

29. A combination according to claim 20 wherein indicia is applied onto a surface of said strip.

30. A combination according to claim 20 wherein indicia is applied onto said smooth surface.

* * * * *